United States Patent
Lan

(10) Patent No.: US 11,383,161 B2
(45) Date of Patent: Jul. 12, 2022

(54) VIRTUAL CHARACTER CONTROL METHOD AND APPARATUS, TERMINAL, AND COMPUTER-READABLE STORAGE MEDIUM

(71) Applicant: TENCENT TECHNOLOGY (SHENZHEN) COMPANY LTD, Guangdong (CN)

(72) Inventor: Xin Zi Lan, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 17/029,818

(22) Filed: Sep. 23, 2020

(65) Prior Publication Data

US 2021/0001218 A1  Jan. 7, 2021

Related U.S. Application Data

(63) Continuation of application No. PCT/CN2019/107258, filed on Sep. 23, 2019.

(30) Foreign Application Priority Data

Sep. 28, 2018 (CN) .......................... 201811143453.4

(51) Int. Cl.
*A63F 13/42* (2014.01)
*A63F 13/537* (2014.01)
(Continued)

(52) U.S. Cl.
CPC ............ *A63F 13/42* (2014.09); *A63F 13/537* (2014.09); *A63F 13/55* (2014.09); *A63F 13/822* (2014.09); *A63F 13/837* (2014.09)

(58) Field of Classification Search
CPC ........ A63F 13/42; A63F 13/537; A63F 13/55; A63F 13/2145; A63F 2250/025; A63F 2300/1075
(Continued)

(56) References Cited

U.S. PATENT DOCUMENTS 10,471,345 B1 *  11/2019  Fuchs ................... A63F 13/537
2013/0084980 A1 *  4/2013  Hammontree ...... A63F 13/2145
463/36
(Continued)

FOREIGN PATENT DOCUMENTS

CN  105468278 A  4/2016

OTHER PUBLICATIONS

First Office Action of Chinese Application No. 201811143453.4 dated Jan. 6, 2020.
(Continued)

*Primary Examiner* — Jay Trent Liddle
*Assistant Examiner* — Ryan Hsu
(74) *Attorney, Agent, or Firm* — Sughrue Mion, PLLC

(57) ABSTRACT

A virtual character control method is provided. The method includes displaying a user interface (UI) of an application program, the UI including a virtual environment image and a movement control superimposed on the virtual environment image, and the virtual environment image being an image of a virtual environment, including a virtual character, observed with a perspective; receiving a pressure operation with respect to the movement control, the pressure operation having a pressure greater than a pressure threshold; and controlling, based on the pressure operation satisfying a trigger condition, the virtual character to perform a target action in the virtual environment. Apparatus, terminal, and non-transitory computer-readable storage medium counterparts are also contemplated.

18 Claims, 9 Drawing Sheets

(51) Int. Cl.
*A63F 13/55* (2014.01)
*A63F 13/822* (2014.01)
*A63F 13/837* (2014.01)

(58) Field of Classification Search
USPC .......................................................... 463/31
See application file for complete search history.

(56) References Cited

U.S. PATENT DOCUMENTS

| | | | | |
|---|---|---|---|---|
| 2014/0066195 A1* | 3/2014 | Matsui | ..................... | A63F 13/06 |
| | | | | 463/30 |
| 2014/0066200 A1* | 3/2014 | Matsui | .................. | A63F 13/533 |
| | | | | 463/31 |
| 2014/0125590 A1* | 5/2014 | Flagg | .................. | A63F 13/2145 |
| | | | | 345/157 |
| 2015/0231500 A1* | 8/2015 | Aizono | ................. | A63F 13/833 |
| | | | | 463/31 |
| 2018/0121000 A1* | 5/2018 | Klein | .................... | G06F 3/0488 |
| 2018/0373376 A1* | 12/2018 | Kurabayashi | ......... | A63F 13/533 |

OTHER PUBLICATIONS

Second Office Action of Chinese Application No. 201811143453.4 dated Apr. 24, 2020.
International Search Report of PCT/CN2019/107258 dated Nov. 27, 2019 [PCT/ISA/210].
Written Opinion of PCT/CN2019/107258 dated Nov. 27, 2019 [PCT/ISA/237].

* cited by examiner

VIRTUAL CHARACTER CONTROL METHOD AND APPARATUS, TERMINAL, AND COMPUTER-READABLE STORAGE MEDIUM

CROSS-REFERENCE TO RELATED APPLICATION(S)

This application is a bypass continuation application of International Application No. PCT/CN2019/107258, filed on Sep. 23, 2019, which claims priority to Chinese Patent Application No. 201811143453.4, filed with the China National Intellectual Property Administration on Sep. 28, 2018 and entitled "VIRTUAL CHARACTER CONTROL METHOD AND APPARATUS, DEVICE, AND STORAGE MEDIUM", the disclosures of which are herein incorporated by reference in their entireties.

FIELD

Embodiments of the disclosure relate to the field of human-computer interaction, and in particular, to a virtual character control method and apparatus, a terminal, and a computer-readable storage medium.

BACKGROUND

Touchscreen-equipped terminals such as a smartphone and a tablet computer are provided with various virtual-environment-based application programs, for example, a virtual reality application program, a three-dimensional (3D) map application program, a military simulation program, a third-person shooting (TPS) game, a first-person shooting (FPS) game, and a multiplayer online battle arena (MOBA) game.

In the application programs, a user may control actions of a virtual character in the application programs by using the touchscreen. For example, in the FPS game, a touch technology is used to move a position or a perspective of a virtual character. For example, a game interface is provided with a virtual joystick control. When playing the game, the user controls the virtual character to move forward by pressing and sliding upward the virtual joystick control, controls the virtual character to move backward by sliding downward the virtual joystick control, controls the virtual character to move leftward by sliding the virtual joystick control leftward, or controls the virtual character to move rightward by sliding the virtual joystick control rightward.

Generally, a virtual environment image is displayed in a user interface (UI) of an application program, and a control is superimposed on a region (e.g., an edge) of the virtual environment image. The control covers a part of the virtual environment image. When operating the application program, the user controls the application program and the virtual character in the virtual environment image by using the control. Generally, a plurality of controls need to be set on the virtual environment image. For example, to enable the virtual character to perform a series of actions such as crouching, jumping, and switching a gun, the application program needs to be provided with a plurality of corresponding controls to control the virtual character to correspondingly perform the series of actions. The plurality of controls occupy a large area in the UI, and a covered area of the displayed virtual environment image is also large, which makes it difficult for the user to observe the virtual environment image.

SUMMARY

According to example embodiments of the disclosure, a virtual character control method and apparatus, a terminal, and a computer-readable storage medium are provided.

According to an aspect of an example embodiment, there is provided a virtual character control method, performed in a terminal, an application program being installed in the terminal, the method including: displaying a user interface (UI) of the application program, the UI including a virtual environment image and a movement control superimposed on the virtual environment image, and the virtual environment image being an image of a virtual environment, including a virtual character, observed with a perspective; receiving a pressure operation with respect to the movement control, the pressure operation having a pressure greater than a pressure threshold; and controlling, based on the pressure operation satisfying a trigger condition, the virtual character to perform a target action in the virtual environment.

According to an aspect of an example embodiment, there is provided a virtual character control apparatus, an application program being installed in a terminal, the apparatus including: at least one memory configured to store program code; and at least one processor configured to read the program code and operate as instructed by the program code, the program code including: display code configured to cause at least one of the at least one processor to display a user interface (UI) of the application program, the UI including a virtual environment image and a movement control superimposed on the virtual environment image, and the virtual environment image being an image of a virtual environment, including a virtual character, observed with a perspective; receiving code configured to cause at least one of the at least one processor to receive a pressure operation with respect to the movement control, the pressure operation having a pressure greater than a pressure threshold; and control code configured to cause at least one of the at least one processor to, based on the pressure operation satisfying a trigger condition, control the virtual character to perform a target action in the virtual environment.

According to an aspect of an example embodiment, there is provided a terminal, including a processor and a memory, the memory storing program code executable by the processor to perform: displaying a user interface (UI) of an application program, the UI including a virtual environment image and a movement control superimposed on the virtual environment image, and the virtual environment image being an image of a virtual environment, including a virtual character, observed with a perspective; receiving a pressure operation with respect to the movement control, the pressure operation having a pressure greater than a pressure threshold; and controlling, based on the pressure operation satisfying a trigger condition, the virtual character to perform a target action in the virtual environment.

According to an aspect of an example embodiment, there is provided a non-transitory computer-readable storage medium, storing program code executable by a processor to perform: displaying a user interface (UI) of an application program, the UI including a virtual environment image and a movement control superimposed on the virtual environment image, and the virtual environment image being an image of a virtual environment, including a virtual character, observed with a perspective; receiving a pressure operation with respect to the movement control, the pressure operation having a pressure greater than a pressure threshold; and controlling, based on the pressure operation satisfying a trigger condition, the virtual character to perform a target action in the virtual environment.

In the above embodiments, the step of controlling may also be understood to include determining that the pressure operation meets a trigger condition and controlling the virtual character to perform a target action in the virtual environment.

In some embodiments, the virtual environment image includes an image of a virtual environment. The image may include a virtual character, part of a virtual character (e.g., head, hand, leg, weapon, a combination thereof, etc.). The image may also include the virtual character's view or perspective only, without the virtual character being in the image (e.g., cannot see the virtual character or any part of the virtual character on the screen of the terminal or apparatus).

BRIEF DESCRIPTION OF THE DRAWINGS

To describe the technical solutions in the example embodiments of the disclosure more clearly, the following briefly describes the accompanying drawings for describing the example embodiments. The accompanying drawings in the following description show merely some embodiments of the disclosure, and a person of ordinary skill in the art may still derive other drawings and/or other embodiments from the accompanying drawings without creative efforts.

DETAILED DESCRIPTION

Figure 1:
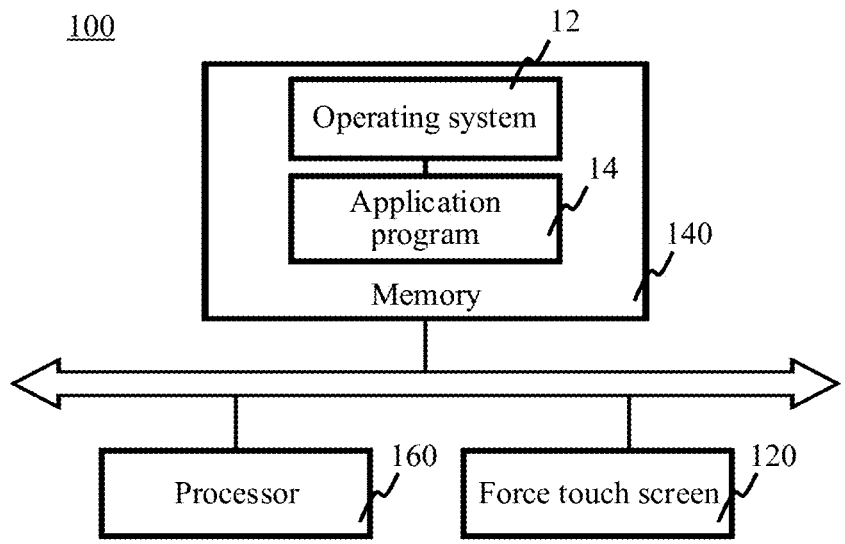
FIG. 1 is a structural block diagram of a terminal according to an example embodiment of the disclosure.

To make objectives, technical solutions, and advantages of the disclosure clearer, the following further describes in detail implementations of the disclosure with reference to the accompanying drawings.

In subsequent descriptions, suffixes such as "module", "component", or "unit" that are used to represent elements are merely conducive to the descriptions of the embodiments, and have no specific meanings themselves. It will be understood that, the terms, such as "unit," "module," "component," "part," etc., should be understood as a unit that performs at least one function or operation and that may be embodied as hardware, software, or a combination thereof.

Although elements (or thresholds or applications or instructions or operations) are described by using terms such as "first" and "second" for a plurality of times, the elements should not be limited by these terms. These terms are merely used to distinguish between an element and another element. For example, a first operation may be referred to as a second operation, and the second operation may also be referred to as the first operation.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

First, several terms involved in the embodiments of the disclosure are introduced.

Virtual environment: A virtual environment is displayed (or provided) when an application program runs on a terminal. The virtual environment may be a simulated environment of the real world, or may be a semi-simulated and semi-fictional three-dimensional (3D) environment, or may be an entirely fictional 3D environment. The virtual environment may be any one of a two-dimensional virtual environment, a 2.5-dimensional virtual environment, and a 3D virtual environment. Description is made by using an example in which the virtual environment is a 3D virtual environment in the following embodiments, but no limitation is set thereto. Optionally, the virtual environment is further used for providing an environment for battling between at least two virtual characters. Optionally, the virtual environment is further used for providing an environment for battling between at least two virtual characters with virtual guns. Optionally, the virtual environment is further used for battling between at least two virtual characters using virtual guns within a range of a target region, the range of the target region continuously decreasing over time in the virtual environment.

Virtual character: A movable object in the virtual environment. The movable object may be at least one of a virtual person, a virtual animal, and a cartoon character. Optionally, when the virtual environment is a 3D virtual environment, the virtual character is a 3D model created based on a skeletal animation technology. Each virtual character has a respective shape and size in the 3D virtual environment, and occupies some space in the 3D virtual environment.

Virtual weapon: A virtual item used during battling between at least two virtual characters in the virtual environment. Optionally, the virtual weapon may be a virtual gun that is used in attacks by firing bullets. Optionally, the virtual character may pick up the virtual gun in the virtual environment, and attack with the virtual gun. Optionally, each virtual gun may be provided with at least one slot, and each slot is used for fitting at least one gun accessory. For example, an M416 automatic rifle is generally provided with a muzzle slot, a grip slot, a stripper clip slot, a butt slot, and a scope slot. The stripper clip slot may be fitted with a stripper clip, and the stripper clip may be replaced when all bullets on the stripper clip are consumed.

Stripper clip: A long strip clip loaded with bullets, which is an auxiliary tool for loading bullets and mounted on the virtual gun. Optionally, the bullet capacity of the stripper clip is limited. When all the bullets in the stripper clip are consumed, the stripper clip on the virtual gun may be replaced.

3D Touch: A 3D touch technology including two types of pressure operations, including a PEEK operation and a POP operation. The PEEK operation is a pressure operation with a pressure value less than a pressure threshold. The POP operation is a pressure operation with a pressure value greater than the pressure threshold. In the disclosure, when a pressure operation is determined to be a PEEK operation, the pressure operation is determined to be an operation of moving a spatial position or a perspective of a virtual character. When the pressure operation is determined to be a POP operation, the pressure operation is determined to be an operation of performing a 3D character action of the virtual character.

A terminal in the disclosure may be a portable laptop computer, a mobile phone, a tablet computer, an eBook reader, a Moving Picture Experts Group Audio Layer IV (MP4) player, or the like. An application program supporting a virtual environment, such as an application program supporting a 3D virtual environment, is installed and running in the terminal. The application program may be one of a virtual reality application program, a 3D map application program, a military simulation program, a TPS game, an FPS game, or a MOBA game. Also, the application program may be a virtual character control application program, a gaming application program, etc. Optionally, the application program may be a standalone application program, such as a standalone 3D game program, or may be an online application program.

FIG. 1 is a structural block diagram of a terminal according to an example embodiment of the disclosure. The terminal 100 includes a force touch screen 120, a memory 140, and a processor 160.

The force touch screen 120 may be a capacitive touch screen or a resistive touch screen. The force touch screen 120 is configured to implement interaction between the terminal 100 and a user.

The memory 140 may include one or more computer-readable storage media. The memory 140 is configured to store a configuration file of an application program to implement normal operation of the application program by an operating system. The configuration file includes a configuration file storing configuration information of a target character action (or target action). An operating system 12 and an application program 14 are installed in the memory 140.

The operating system 12 is basic software provided for the application program 14 to perform secure access to computer hardware. The operating system may be an Android system or an iOS system.

The application program 14 is an application program supporting a virtual environment, a virtual character being included in the virtual environment. Optionally, the application program 14 is an application program supporting a 3D virtual environment. The application program 14 may be one of a virtual reality application program, a 3D map application program, a military simulation program, a TPS game, an FPS game, a MOBA game, or a multiplayer gunfight survival game. Optionally, the application program 14 may be a standalone application program, such as a standalone 3D game program.

The processor 160 may include one or more processing cores, for example, a 4-core processor or an 8-core processor. The processor 160 is configured to obtain the configuration file of the target character action stored in the memory according to a pressure operation received on the force touch screen, and then control the virtual character to perform the target character action according to the configuration information in the configuration file. The target character action is an action performed by the virtual character according to an operating instruction. Optionally, the target character action is an action performed by a 3D character model of the virtual character.

Figure 2:
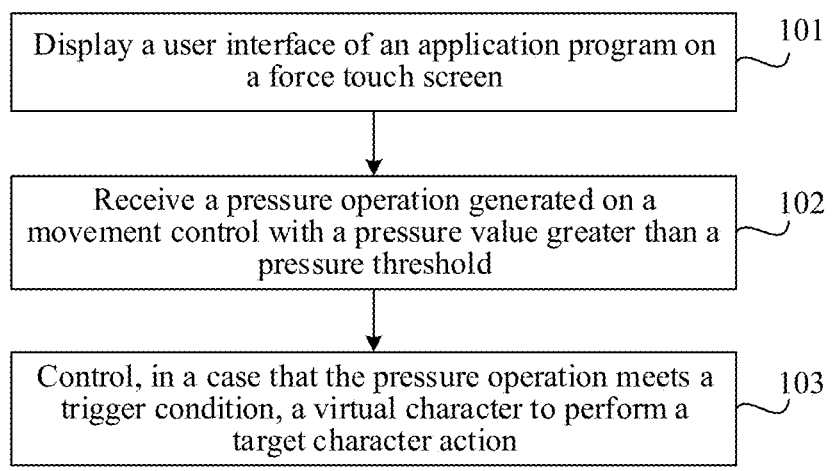
FIG. 2 is a flowchart of a virtual character control method according to an example embodiment of the disclosure.

FIG. 2 is a flowchart of a virtual character control method according to an example embodiment of the disclosure. The method is described by using an example in which the method is applied to the terminal shown in FIG. 1. The method includes the following operations 101-103:

Operation 101: Display a UI of an application program on a force touch screen.

The terminal includes the force touch screen. The terminal displays the UI of the application program on the force touch screen.

Optionally, the application program may be one of a virtual reality application program, a 3D map application program, a military simulation program, a TPS game, an FPS game, or a MOBA game.

Optionally, the UI includes a virtual environment image layer below and a control layer above. The virtual environment image layer is an interface displayed based on a perspective, that is used for observing a virtual environment. The perspective may be at least one of a first-person perspective, a third-person perspective, or other perspectives. Other perspectives may be a top perspective or any other possible perspectives. The first-person perspective is a perspective corresponding to a virtual environment image (e.g., a virtual environment picture) and may be a perspective of a virtual character that observes the virtual environment (such as a perspective of a camera at eyes of the virtual character). The virtual environment image corresponding to the first-person perspective does not include the virtual character. The third-person perspective may be a perspective of a camera that observes the virtual environment, the camera being behind the virtual character. A virtual environment image corresponding to the third-person perspective includes the virtual character, and is obtained by observing the virtual environment through a camera model behind the virtual character (e.g., the head or the back of the virtual character). For example, a 3D model of the virtual character and a virtual gun held by the virtual character can be seen from the virtual environment image. The top perspective is a perspective of overlooking a subject in the virtual environment (e.g., overlooking from the sky in the virtual environment). A virtual environment image corresponding to the top perspective includes the virtual character. The control layer includes, for example but not limited to, at least one of a setting control, a dialog box editing control, a speaker control, a microphone control, a movement control, a shooting control, a jumping control, a crouching control, a weapon switching control, a stripper clip switching control, a driving control, and a health regeneration control. Through the controls in the control layer, the terminal may implement a corresponding function in the application program and control the virtual character to complete a corresponding action. The movement control includes a position movement control and a perspective movement control. The movement control may be a control configured to control the virtual character in the virtual environment to perform a movement action according to a sliding operation. The position movement control may be a spatial position movement control. When a sliding operation is performed on the position movement control, the virtual character may be controlled to perform a spatial position movement.

Optionally, in the UI, a virtual weapon held by the virtual character is correspondingly provided with weapon slots. The weapon slots may be fitted with a virtual gun, a virtual crossbow, and a virtual sword. The virtual gun is correspondingly provided with accessory slots and the accessory slots may be fitted with a grip, a muzzle, a scope, a butt, a stripper clip, and the like.

Operation 102: Receive a pressure operation generated on the movement control with a pressure value greater than a pressure threshold.

The terminal receives the pressure operation generated on the movement control, the pressure value of the pressure operation being greater than the pressure threshold. Optionally, the pressure threshold may be set by a programmer of the application program or customized by a user.

Optionally, the UI further includes the movement control. The movement control is configured to control the virtual character to move forward, backward, leftward, or rightward or control the perspective of the virtual character to move upward, downward, leftward, or rightward when the pressure value of the pressure operation on the movement control is less than or equal to the pressure threshold.

Figure 3:
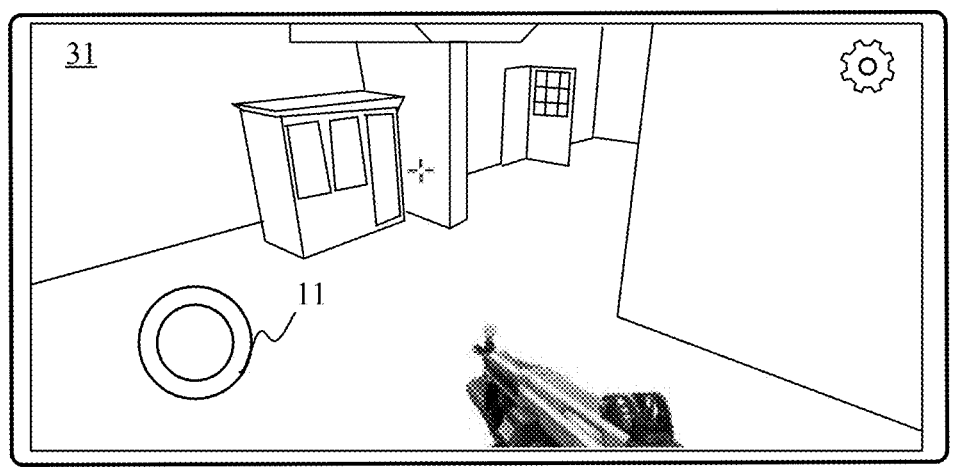
FIG. 3 is a schematic diagram of a UI of a virtual character control method according to an example embodiment of the disclosure.

For example, referring to FIG. 3, a UI 31 of the application program includes a first control 11. Optionally, the terminal displays the UI of the application program on the force touch screen in a landscape mode, the first control 11 being located on the left of the screen.

Optionally, the first control 11 may be the spatial position movement control of the virtual character or the perspective movement control of the virtual character. The first control 11 may also be referred to as a movement control.

When the first control 11 is the spatial position movement control of the virtual character, the first control 11 may be used to control moving of a spatial position of the virtual character in the virtual environment, for example, forward, backward, leftward, or rightward. Since the virtual character is located in a 3D virtual environment, the user may control the virtual character to move forward, backward, leftward, or rightward in the 3D virtual environment through the first control 11. For example, it is assumed that a pressure value of a pressure operation (or referred to as a touch operation) on the first control 11 is less than or equal to the pressure threshold. If the user slides upward along a vertical direction on the first control 11, the virtual character in the 3D virtual environment displayed on the terminal is controlled to move forward. If the user slides downward along the vertical direction on the first control 11, the virtual character in the 3D virtual environment displayed on the terminal is controlled to move backward. If the user slides leftward along a horizontal direction on the first control 11, the virtual character in the 3D virtual environment displayed on the terminal is controlled to move leftward. If the user slides rightward along the horizontal direction on the first control 11, the virtual character in the 3D virtual environment displayed on the terminal is controlled to move rightward.

When the first control 11 is the perspective movement control of the virtual character, the first control 11 is configured to control a direction of a first perspective of the virtual character to move. For example, it is assumed that a pressure value of a pressure operation on the first control 11 is less than or equal to the pressure threshold. If the user slides upward along a vertical direction on the first control 11, the first perspective of the user in a game moves upward. If the user slides downward along the vertical direction on the first control 11, the first perspective of the user in the game moves downward. If the user slides leftward along the horizontal direction on the first control 11, the first perspective of the user in the game moves leftward. If the user slides rightward along the horizontal direction on the first control 11, the first perspective of the user in the game moves rightward.

Optionally, when the pressure value of the pressure operation on the movement control is greater than the pressure threshold, the movement control is further configured to control the virtual character to perform a target character action.

Operation 103: Control, in a case that the pressure operation meets a trigger condition, the virtual character to perform the target character action (or target action).

Optionally, the target character action may be set by the programmer of the application program, or the user may customize the target character action. When the pressure operation meets the trigger condition, the terminal controls the virtual character to perform a corresponding set target character action.

Optionally, the target character action includes at least one of a jumping action, a crouching action, a stripper clip switching action, and a weapon switching action.

For example, when the pressure value of the pressure operation on the first control 11 is greater than the pressure threshold, if the target character action is customized to be the jumping action, the terminal controls the virtual character to perform the jumping action. If the target character action is customized to be the crouching action, the terminal controls the virtual character to perform the crouching action. If the target character action is customized to be the stripper clip switching action, the terminal controls the virtual character to perform the stripper clip switching action. If the target character action is customized to be the weapon switching action, the terminal controls the virtual character to perform the weapon clip switching action.

In some embodiments, one of the target character actions that is to be performed when a pressure value of a pressure operation is greater than the pressure threshold is customized by the user.

According to the virtual character control method provided in the disclosure, a UI of an application program is displayed on a force touch screen, a pressure operation generated on a movement control is received, and in a case that the pressure operation meets a trigger condition, a virtual character is controlled to perform a target character action. In this way, two different control operations on the movement control are implemented by detecting a pressure value of the pressure operation generated on the movement control and using a pressure threshold as a boundary, which may save settings of some controls and reduce an area of a virtual environment image covered by controls.

Figure 4:
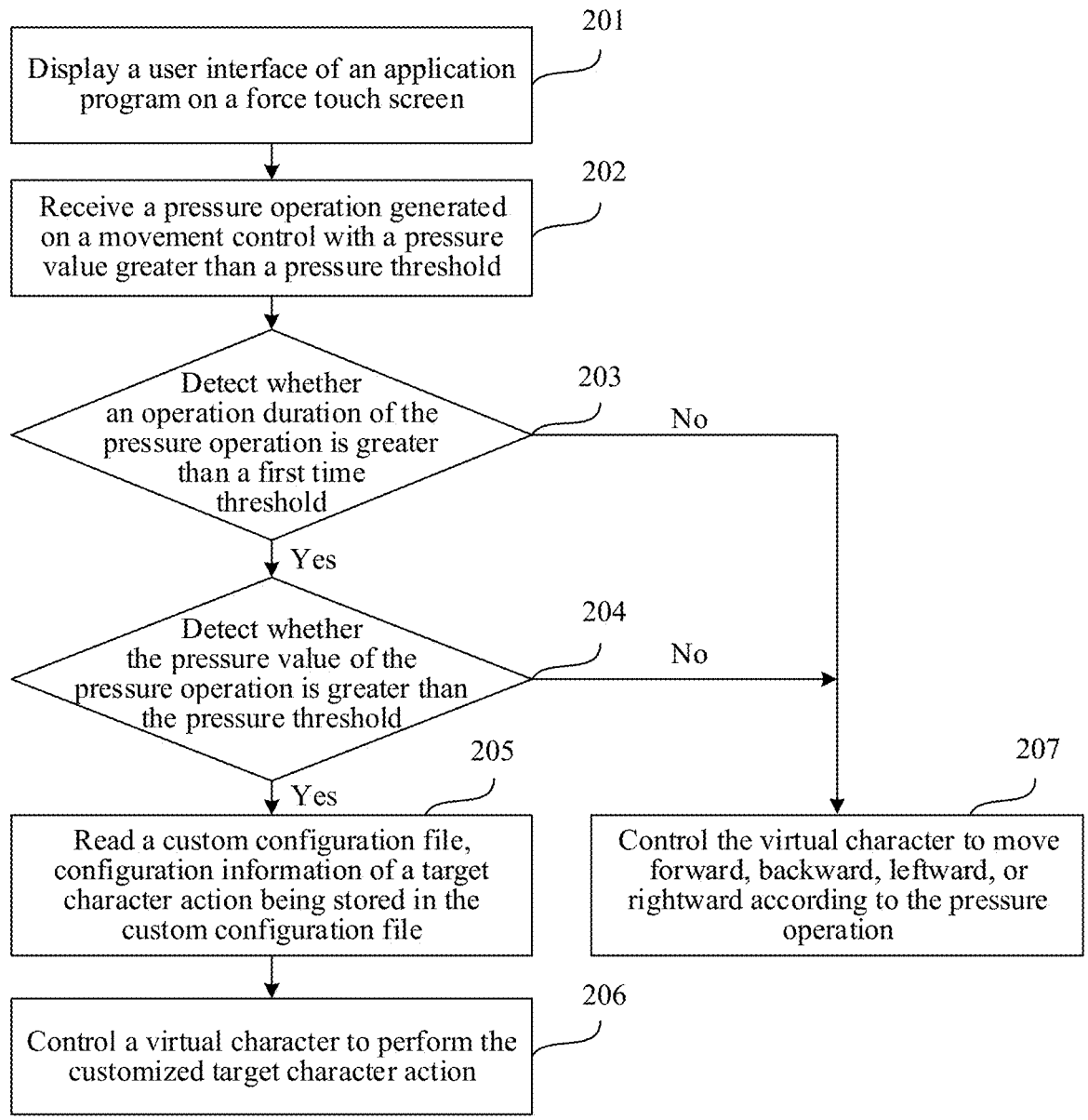
FIG. 4 is a flowchart of a virtual character control method according to another example embodiment of the disclosure.

Based on the example embodiment of FIG. 2, the virtual character control method is further described with reference to FIG. 4. The method is described by using an example in which the method is applied to the terminal shown in FIG. 1. The method includes the following operations 201-207:

Operation 201: Display a UI of an application program on a force touch screen.

For details of this operation, reference may be made to operation 101 in FIG. 2.

Operation 202: Receive a pressure operation generated on the movement control with a pressure value greater than a pressure threshold.

For details of this operation, reference may be made to operation 102 in FIG. 2.

Operation 203: Detect whether an operation duration of the pressure operation is greater than a first time threshold.

Optionally, a trigger condition of the pressure operation includes that the operation duration of the pressure operation is greater than the first time threshold.

The terminal detects the operation duration of the pressure operation. When the operation duration of the pressure operation is greater than the first time threshold, the pressure operation meets the trigger condition, and operation 204 is performed. When the operation duration of the pressure operation is less than or equal to the first time threshold, operation 207 is performed.

Optionally, the first time threshold is set by the programmer of the application program or set by a user.

Operation 204: Detect whether the pressure value of the pressure operation is greater than the pressure threshold.

The terminal detects the pressure value of the pressure operation. When the pressure value of the pressure operation is greater than the pressure threshold, the pressure operation meets the trigger condition, operation 205 is performed. When the pressure value of the pressure operation is less than or equal to the pressure threshold, operation 207 is performed.

Operation 205: Read a custom configuration file, configuration information of a target character action being stored in the custom configuration file.

Optionally, the target character action is customized by a user. When the pressure operation meets the trigger condition, the terminal reads the custom configuration file, the configuration information of the target character action being stored in the custom configuration file.

Optionally, the target character action includes, for example but not limited to, at least one of a jumping action, a crouching action, a stripper clip switching action, and a weapon switching action.

Figure 5:
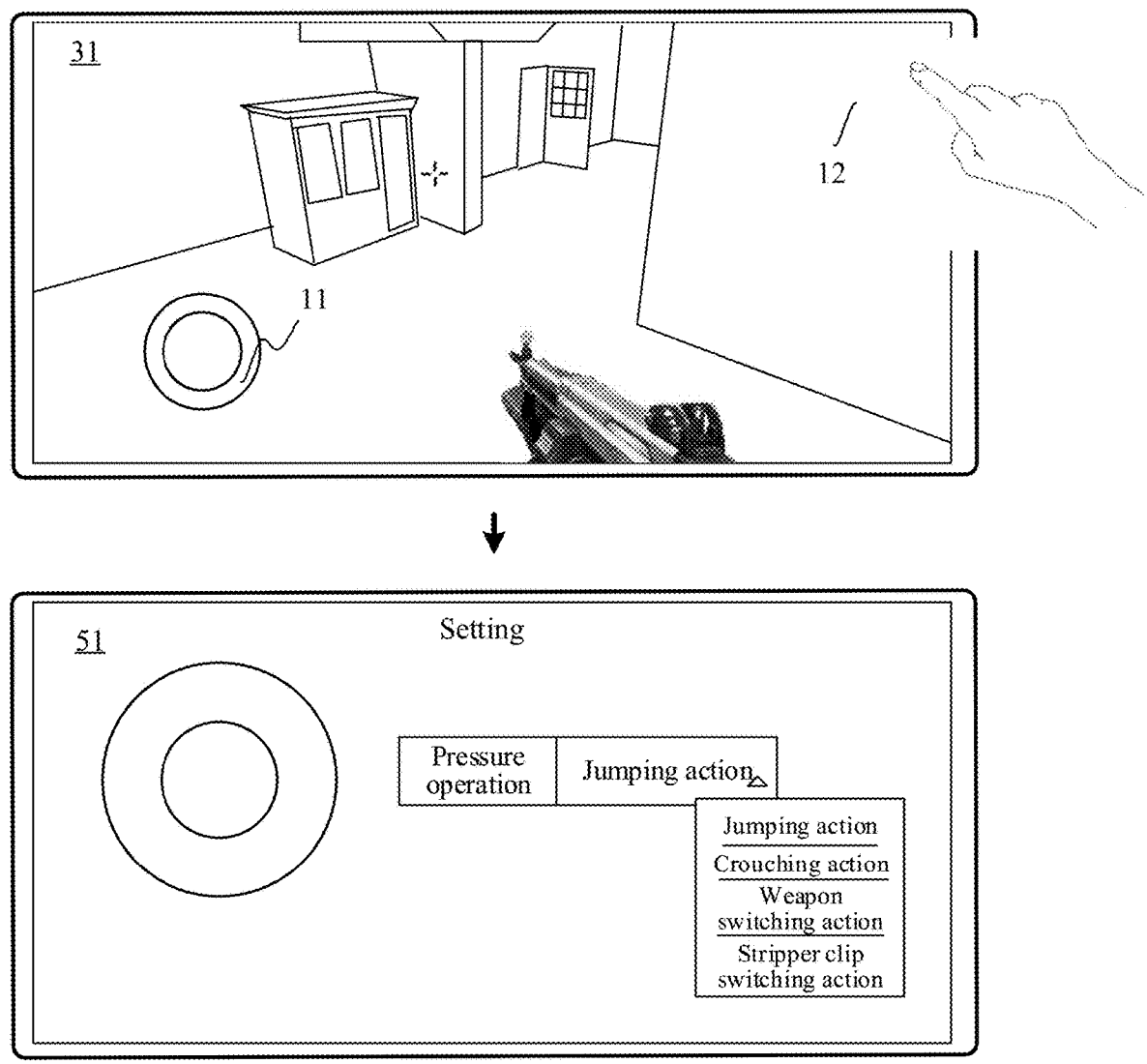
FIG. 5 is a schematic diagram of a UI of a virtual character control method according to another example embodiment of the disclosure.

For example, the user customizes the target character action. Referring to FIG. 5, the UI 31 further includes a setting control 12. The user clicks or taps the setting control 12 to display a setting interface 51, and selects, in the setting interface 51, a target character action corresponding to the pressure operation. The target character action may be one of the jumping action, the crouching action, the stripper clip switching action, and the weapon switching action.

For example, as shown in Table 1, when the pressure value of the pressure operation is greater than the pressure threshold, if the target character action customized by the user is the jumping action, the target character action corresponding to the pressure operation with the pressure value greater than the pressure threshold is configured as the jumping action in the configuration file.

TABLE 1

| Pressure value of pressure operation | Target character action |
| --- | --- |
| Pressure value of pressure operation being greater than pressure threshold | Jumping action |

As shown in Table 2, when the pressure value of the pressure operation is greater than the pressure threshold, if the target character action customized by the user is the crouching action, the target character action corresponding to the pressure operation with the pressure value greater than the pressure threshold is configured as the crouching action in the configuration file.

TABLE 2

| Pressure value of pressure operation | Target character action |
| --- | --- |
| Pressure value of pressure operation being greater than pressure threshold | Crouching action |

As shown in Table 3, when the pressure value of the pressure operation is greater than the pressure threshold, if the target character action customized by the user is the stripper clip switching action, the target character action corresponding to the pressure operation with the pressure value greater than the pressure threshold is configured as the stripper clip switching action in the configuration file.

TABLE 3

| Pressure value of pressure operation | Target character action |
| --- | --- |
| Pressure value of pressure operation being greater than pressure threshold | Stripper clip switching action |

As shown in Table 4, when the pressure value of the pressure operation is greater than the pressure threshold, if the target character action customized by the user is the weapon switching action, the target character action corresponding to the pressure operation with the pressure value greater than the pressure threshold is configured as the weapon switching action in the configuration file.

TABLE 4

| Pressure value of pressure operation | Target character action |
| --- | --- |
| Pressure value of pressure operation being greater than pressure threshold | Weapon switching action |

Operation 206: Control the virtual character to perform the customized target character action.

The terminal controls the virtual character to perform the customized target character action according to the configuration information of the target character action, for example, controls the virtual character to jump, crouch, switch a stripper clip, or switch a weapon.

For example, according to a correspondence in Table 1, when the pressure value of the pressure operation is greater than the pressure threshold, if the target character action customized by the user is the jumping action, the terminal obtains configuration information corresponding to the jumping action in the configuration file, and controls the virtual character to perform the jumping action according to the configuration information. Alternatively, according to a correspondence in Table 2, when the pressure value of the pressure operation is greater than the pressure threshold, if the target character action customized by the user is the crouching action, the terminal obtains configuration information of the crouching action in the configuration file, and controls the virtual character to perform the crouching action according to the configuration information. Alternatively, according to a correspondence in Table 3, when the pressure value of the pressure operation is greater than the pressure threshold, if the target character action customized by the user is the stripper clip switching action, the terminal obtains configuration information of the stripper clip switching action in the configuration file, and controls the virtual character to perform the stripper clip switching action according to the configuration information.

Operation 207: Control the virtual character to move forward, backward, leftward, or rightward according to the pressure operation.

When the pressure operation does not meet the trigger condition, the terminal controls the virtual character to move forward, backward, leftward, or rightward through the pressure operation on the movement control.

For example, when the pressure value of the pressure operation on the position movement control is less than or equal to the pressure threshold, if the user slides upward along the vertical direction on the position movement control, the virtual character in the 3D virtual environment displayed on the terminal is controlled to move forward. If the user slides downward along the vertical direction on the position movement control, the virtual character in the 3D virtual environment displayed on the terminal is controlled to move backward. If the user slides leftward along the horizontal direction on the position movement control, the virtual character in the 3D virtual environment displayed on the terminal is controlled to move leftward. If the user slides rightward along the horizontal direction on the position movement control, the virtual character in the 3D virtual environment displayed on the terminal is controlled to move rightward.

Alternatively, when the pressure value of the pressure operation on the perspective movement control is less than or equal to the pressure threshold, if the user slides upward along the vertical direction on the perspective movement control, the first perspective of the user in the game is moved upward. If the user slides downward along the vertical direction on the perspective movement control, the first perspective of the user in the game is moved downward. If the user slides leftward along the horizontal direction on the perspective movement control, the first perspective of the user in the game is moved leftward. If the user slides rightward along the horizontal direction on the perspective movement control, the first perspective of the user in the game is moved rightward.

According to the virtual character control method provided in the disclosure, a UI of an application program is displayed on a force touch screen, a pressure operation generated on a movement control is received, and in a case that the pressure operation meets a trigger condition, a virtual character is controlled to perform a target character action. In this way, two different control operations on the movement control are implemented by detecting a pressure value of the pressure operation generated on the movement control and using a pressure threshold as a boundary, which may save settings of some controls and reduce an area of a virtual environment image covered by controls.

In addition, it is verified whether an operation duration of the pressure operation is greater than a first time threshold, so that a mis-operation (e.g., unintended operation) in a game process is avoided and the game experience of a user is improved.

In optional embodiments based on FIG. 4, the virtual character control method according to an example embodiment when the target character action is the jumping action is described with reference to FIG. 6, and the virtual character control method according to an example embodiment when the target character action is the crouching action is described with reference to FIG. 8.

Figure 6:
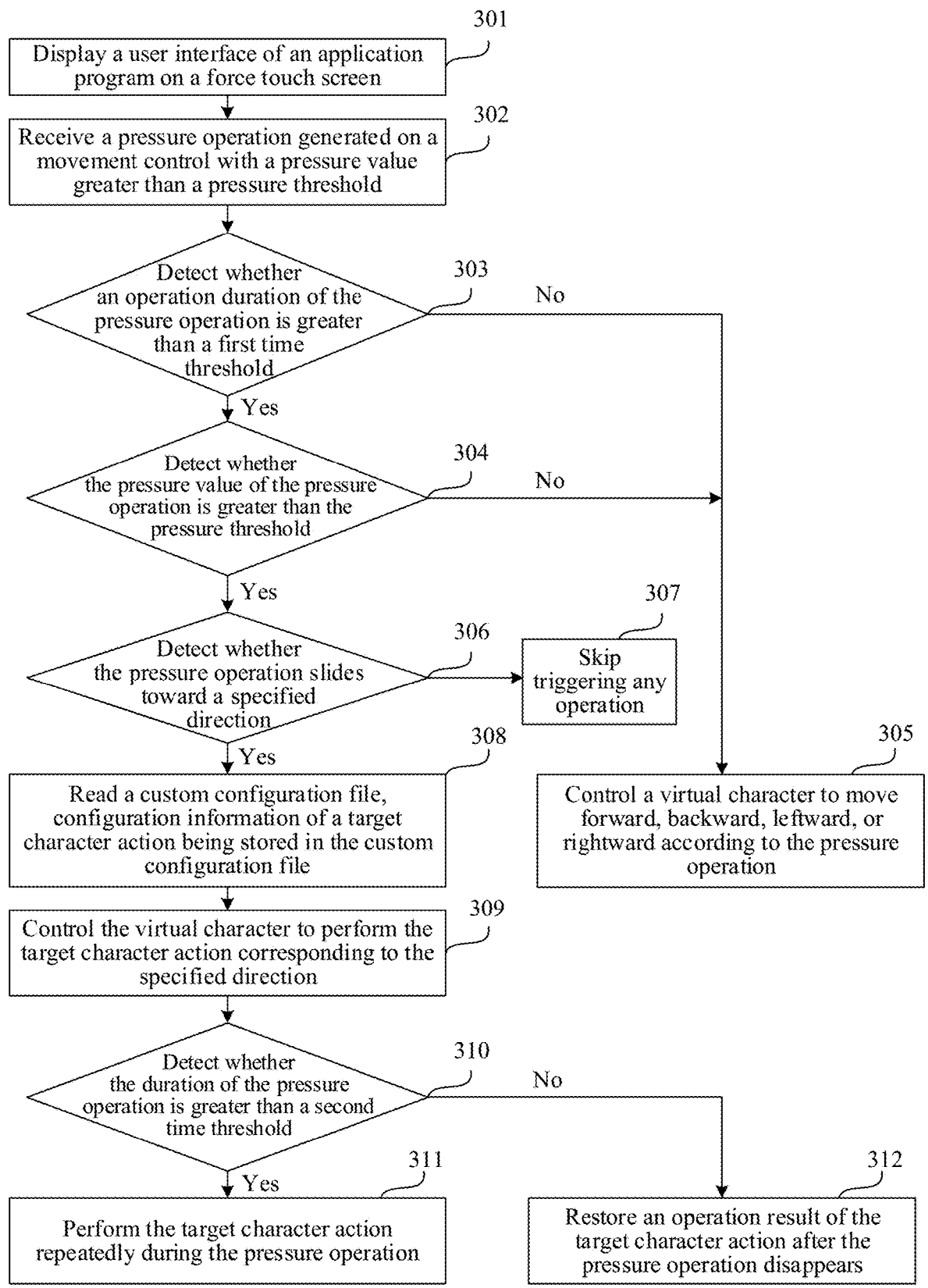
FIG. 6 is a flowchart of a virtual character control method according to another example embodiment of the disclosure.

FIG. 6 is a flowchart of a virtual character control method according to another example embodiment of the disclosure. The method is described by using an example in which the method is applied to the terminal shown in FIG. 1. The method includes the following operations 301-312:

Operation 301: Display a UI of an application program on a force touch screen.

Optional, for example, the application program is an FPS game. A game interface of the FPS game is displayed on the force touch screen of the terminal. The game interface includes a virtual environment image of an indoor environment, and the virtual environment image includes a virtual character. The virtual environment image is a game image displayed based on a first-person perspective of the virtual character, and controls of a display control layer are superimposed on the virtual environment image, to implement corresponding functions of the application program and control the virtual character to complete a corresponding action.

Operation 302: Receive a pressure operation generated on the movement control with a pressure value greater than a pressure threshold.

The terminal receives the pressure operation generated on the movement control. Optionally, the movement control may be a spatial position movement control of the virtual character or a perspective movement control of the virtual character.

When the movement control is the position movement control of the virtual character, if the pressure value of the pressure operation is less than or equal to the pressure threshold, the position movement control may control the virtual character to move forward, backward, leftward, or rightward.

When the movement control is the perspective movement control of the virtual character, if the pressure value of the pressure operation is less than or equal to the pressure threshold, the perspective movement control may control the first perspective of the virtual character to move upward, downward, leftward, or rightward.

Operation 303: Detect whether an operation duration of the pressure operation is greater than a first time threshold.

Optionally, a trigger condition of the pressure operation includes that the operation duration of the pressure operation is greater than the first time threshold.

The terminal detects the operation duration of the pressure operation. When the operation duration of the pressure operation is greater than the first time threshold, the pressure operation meets the trigger condition, and operation 304 is performed. When the operation duration of the pressure operation is less than or equal to the first time threshold, operation 305 is performed.

Operation 304: Detect whether the pressure value of the pressure operation is greater than the pressure threshold.

The terminal detects the pressure value of the pressure operation. When the pressure value of the pressure operation is greater than the pressure threshold, the pressure operation meets the trigger condition, operation 306 is performed. When the pressure value of the pressure operation is less than or equal to the pressure threshold, operation 305 is performed.

Operation 305: Control the virtual character to move forward, backward, leftward, or rightward according to the pressure operation.

When the pressure operation does not meet the trigger condition, the terminal controls the virtual character to move forward, backward, leftward, or rightward through the pressure operation on the movement control.

For example, it is assumed that the pressure value of the pressure operation on the movement control is less than or equal to the pressure threshold. If a user slides upward along a vertical direction on the movement control, the virtual character in the 3D virtual environment displayed on the terminal is controlled to move forward. If the user slides downward along the vertical direction on the movement control, the virtual character in the 3D virtual environment displayed on the terminal is controlled to move backward. If the user slides leftward along the horizontal direction on the movement control, the virtual character in the 3D virtual environment displayed on the terminal is controlled to move leftward. If the user slides rightward along the horizontal direction on the movement control, the virtual character in the 3D virtual environment displayed on the terminal is controlled to move rightward.

Operation 306: Detect whether the pressure operation slides toward a specified direction.

The terminal detects whether the received pressure operation is sliding toward the specified direction. When the pressure operation slides toward the specified direction, it is determined that the trigger condition meets the pressure operation, operation 308 is performed. Otherwise, operation 307 is performed.

Operation 307: Skip triggering any operation.

When the terminal detects that the pressure operation does not slide toward the specified direction, the terminal does not trigger any action in the application program.

Operation 308: Read a custom configuration file, configuration information of a target character action being stored in the custom configuration file.

Optionally, the target character action is customized by a user. When the pressure operation meets the trigger condition, the terminal reads the custom configuration file, the configuration information of the target character action being stored in the custom configuration file.

Optionally, the trigger condition further includes that the pressure operation is a sliding operation toward the specified direction, the specified direction including at least one of an upward direction, a downward direction, a leftward direction, a rightward direction, an up leftward direction, an up rightward direction, a down leftward direction, and a down rightward direction.

The terminal reads the custom configuration file according to the specified direction of the pressure operation, to obtain the configuration information of the target character action corresponding the specified direction. For example, when the specified direction is the upward direction, the corresponding target character action is a jumping action. Alternatively, when the specified direction is the downward direction, the corresponding target character action is a crouching action.

Operation 309: Control the virtual character to perform the target character action corresponding to the specified direction.

The terminal controls the virtual character to perform the target character action corresponding to the specified direction according to the configuration information of the target character action, for example, controls the virtual character to jump, crouch, switch a stripper clip, or switch a weapon.

For example, when the specified direction is the upward direction, the corresponding target character action is the jumping action. When the pressure value of the pressure operation is greater than the pressure threshold, the terminal obtains configuration information of the jumping action in the configuration file, and controls the virtual character to perform the jumping action according to the configuration information. Alternatively, when the specified direction is the downward direction, the corresponding target character action is the crouching action. When the pressure value of the pressure operation is greater than the pressure threshold, the terminal obtains configuration information of the crouching action in the configuration file, and controls the virtual character to perform the crouching action according to the configuration information.

Operation 310: Detect whether the duration of the pressure operation is greater than a second time threshold.

Optionally, when the pressure operation meets the trigger condition, the terminal continues to detect whether the duration of the pressure operation is greater than the second time threshold, the second time threshold being greater than the first time threshold.

When the duration of the pressure operation is greater than the second time threshold, operation 311 is performed. When the duration of the pressure operation is less than or equal to the second time threshold, operation 312 is performed.

Operation 311: Perform the target character action repeatedly during the pressure operation.

When the duration of the pressure operation is greater than the second time threshold, the target character action is repeatedly performed during the pressure operation. For example, when the target character action is the jumping action, the virtual character is controlled to repeatedly perform the jumping action during the pressure operation.

Operation 312: Restore an operation result of the target character action after the pressure operation disappears.

The terminal restores the operation result of the target character action after the pressure operation disappears. For example, when the target character action is the jumping action, after the pressure operation disappears, the virtual character stops the jumping action and restores to a standing posture before the jumping action.

For example, the target character action corresponding to the upward direction is customized by the user to be the jumping action. The user performs a pressure operation in the upward direction on the movement control. The terminal detects that an operation duration of the pressure operation is greater than the first time threshold, and a pressure value of the pressure operation is greater than the pressure threshold. The terminal obtains a configuration file of the jumping action corresponding to the pressure operation in the upward direction according to the pressure operation. The terminal controls the virtual character to perform the jumping action according to configuration information of the jumping action in the configuration file. The terminal detects that the duration of the pressure operation is greater than the second time threshold, and controls the virtual character to repeatedly perform the jumping action during the pressure operation.

According to the virtual character control method provided in the disclosure, a UI of an application program is displayed on a force touch screen, a pressure operation generated on a movement control is received, and in a case that the pressure operation meets a trigger condition, a virtual character is controlled to perform a target character action. In this way, two different control operations on the movement control are implemented by detecting a pressure value of the pressure operation generated on the movement control and using a pressure threshold as a boundary, which may save settings of some controls and reduce an area of a virtual environment image covered by controls.

According to the virtual character control method, it is detected that an operation duration of the pressure operation is greater than a second time threshold, and the target character action is repeatedly performed. In this way, the operation does not need to be repeated, which reduces the number of operations of a user, improves the efficiency of human-computer interaction, and improves the game experience of the user.

In addition, it is detected whether the operation duration of the pressure operation is greater than a first time threshold, which avoids a mis-operations in a game process.

Figure 7:
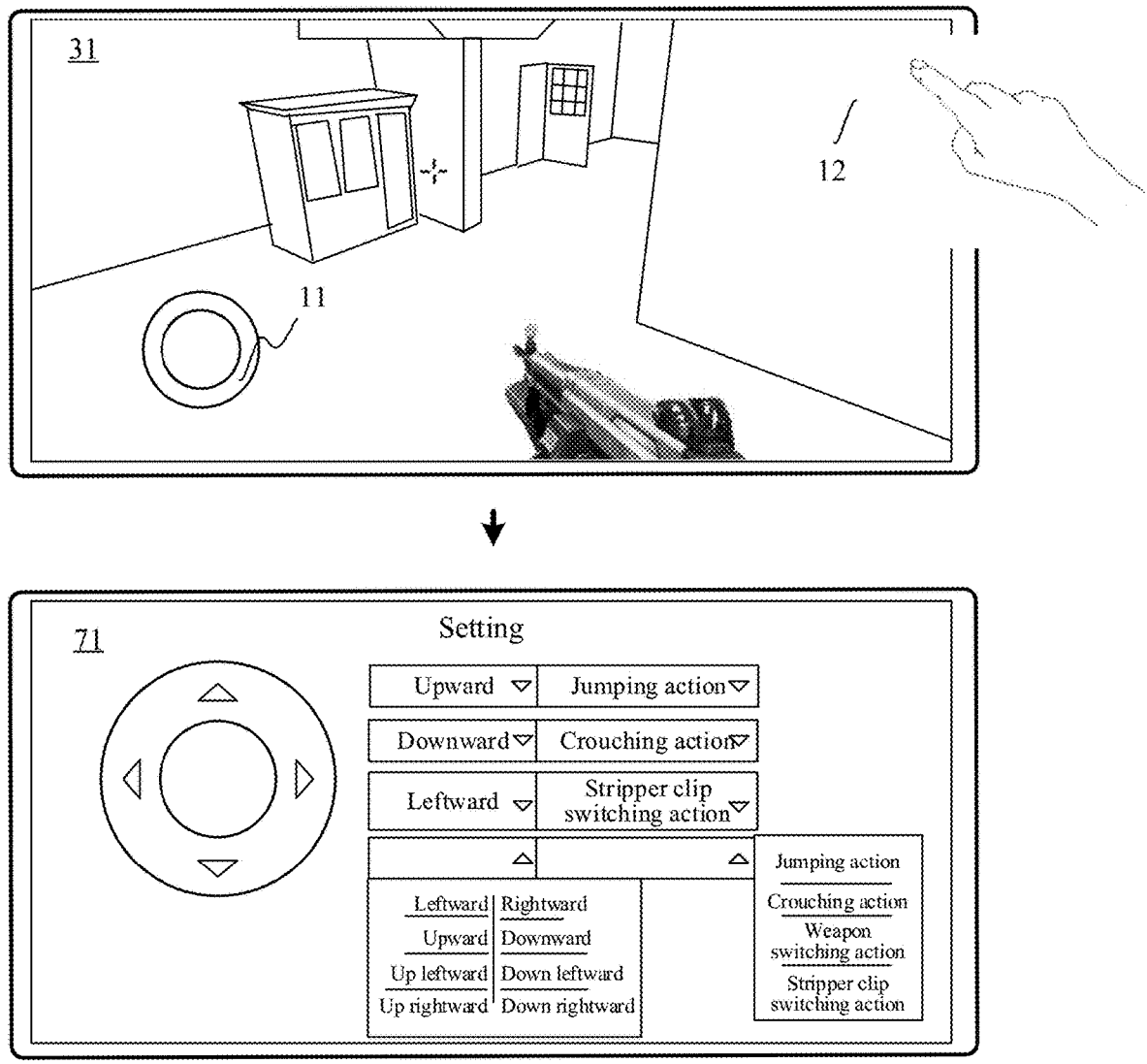
FIG. 7 is a schematic diagram of a UI of a virtual character control method according to another example embodiment of the disclosure.

Based on the example embodiment shown in FIG. 6, the user may customize the target character action in the specified direction. For example, referring to FIG. 7, the user may customize target character actions in different specified directions. Optionally, at most one target character action may be customized in one specified direction. As shown in FIG. 7, the UI 31 further includes a setting control 12 (the setting control may also be presented on other UIs), the user clicks or taps the setting control 12 to display a setting interface 71, and selects a specified direction of the pressure operation and a corresponding target character action in the setting interface 71. The target character action may be one of the jumping action, the crouching action, the stripper clip switching action, and the weapon switching action. For example, the user may set that when the specified direction of the pressure operation is upward, the corresponding target character action is the jumping action; and when the specified direction of the pressure operation is downward, the corresponding target character action is the crouching action.

For example, the terminal changes the configuration file according to the settings of the user. As shown in Table 5, the pressure value of the pressure operation is greater than the pressure threshold, and the user customizes target character actions in different specified directions of the pressure operation. When the specified direction of the pressure operation is the upward direction, the target character action is customized to be the jumping action, and the target character action corresponding to the upward direction of pressure operation is customized to the jumping action in the configuration file. When the specified direction of the pressure operation is the downward direction, the target character action is customized to be the crouching action, and the target character action corresponding to the downward direction of pressure operation is customized to the crouching action in the configuration file. When the specified direction of the pressure operation is the leftward direction, the target character action is customized to be the stripper clip switching action, and the target character action corresponding to the leftward direction of pressure operation is customized to the stripper clip switching action in the configuration file. When the specified direction of the pressure operation is the rightward direction, the target character action is customized to be the weapon switching action, and the target character action corresponding to the rightward direction of pressure operation is customized to the weapon switching action in the configuration file.

TABLE 5

| Pressure value of pressure operation | Specified direction of pressure operation | Target character action |
| --- | --- | --- |
| Pressure value of pressure operation being greater than pressure threshold | Upward direction Downward direction Leftward direction Rightward direction | Jumping action Crouching action Stripper clip switching action Weapon switching action |

Alternatively, as shown in Table 6, the pressure value of the pressure operation is greater than the pressure threshold, and the user customizes target character actions in different specified directions of the pressure operation. When the specified direction of the pressure operation is the up leftward direction, the target character action is customized to be the jumping action, and the target character action corresponding to the up leftward direction of pressure operation is customized to the jumping action in the configuration file. When the specified direction of the pressure operation is the down rightward direction, the target character action is customized to be the crouching action, and the target character action corresponding to the down rightward direction of pressure operation is customized to the crouching action in the configuration file. When the specified direction of the pressure operation is the down leftward direction, the target character action is customized to be the stripper clip switching action, and the target character action corresponding to the down leftward direction of pressure operation is customized to the stripper clip switching action in the configuration file. When the specified direction of the pressure operation is the up rightward direction, the target character action is customized to be the weapon switching action, and the target character action corresponding to the up rightward direction of pressure operation is customized to the weapon switching action in the configuration file.

TABLE 6

| Pressure value of pressure operation | Specified direction of pressure operation | Target character action |
| --- | --- | --- |
| Pressure value of pressure operation being greater than pressure threshold | Up leftward direction Down rightward direction Down leftward direction Up rightward direction | Jumping action Crouching action Stripper clip switching action Weapon switching action |

The terminal controls the virtual character to perform the target character action corresponding to the specified direction according to the custom configuration file.

For example, according to a correspondence in Table 5, under the condition that the pressure value of the pressure operation is greater than the pressure threshold, when the specified direction of the pressure operation is the upward direction, the terminal obtains configuration information of the jumping action in the configuration file, and controls the virtual character to perform the jumping action according to the configuration information of the jumping action. When the specified direction of the pressure operation is the downward direction, the terminal obtains configuration information of the crouching action in the configuration file, and controls the virtual character to perform the crouching action according to the configuration information of the crouching action. When the specified direction of the pressure operation is the leftward direction, the terminal obtains configuration information of the stripper clip switching action in the configuration file, and controls the virtual character to perform the stripper clip switching action according to the configuration information of the stripper clip switching action. When the specified direction of the pressure operation is the rightward direction, the terminal obtains configuration information of the weapon switching action in the configuration file, and controls the virtual character to perform the weapon switching action according to the configuration information of the weapon switching action.

Alternatively, according to a correspondence in Table 6, under the condition that the pressure value of the pressure operation is greater than the pressure threshold, when the specified direction of the pressure operation is the up leftward direction, the terminal obtains configuration information of the jumping action in the configuration file, and controls the virtual character to perform the jumping action according to the configuration information of the jumping action. When the specified direction of the pressure operation is the down rightward direction, the terminal obtains configuration information of the crouching action in the configuration file, and controls the virtual character to perform the crouching action according to the configuration information of the crouching action. When the specified direction of the pressure operation is the down leftward direction, the terminal obtains configuration information of the stripper clip switching action in the configuration file, and controls the virtual character to perform the stripper clip switching action according to the configuration information of the stripper clip switching action. When the specified direction of the pressure operation is the up rightward direction, the terminal obtains configuration information of the weapon switching action in the configuration file, and controls the virtual character to perform the weapon switching action according to the configuration information of the weapon switching action.

Figure 8:
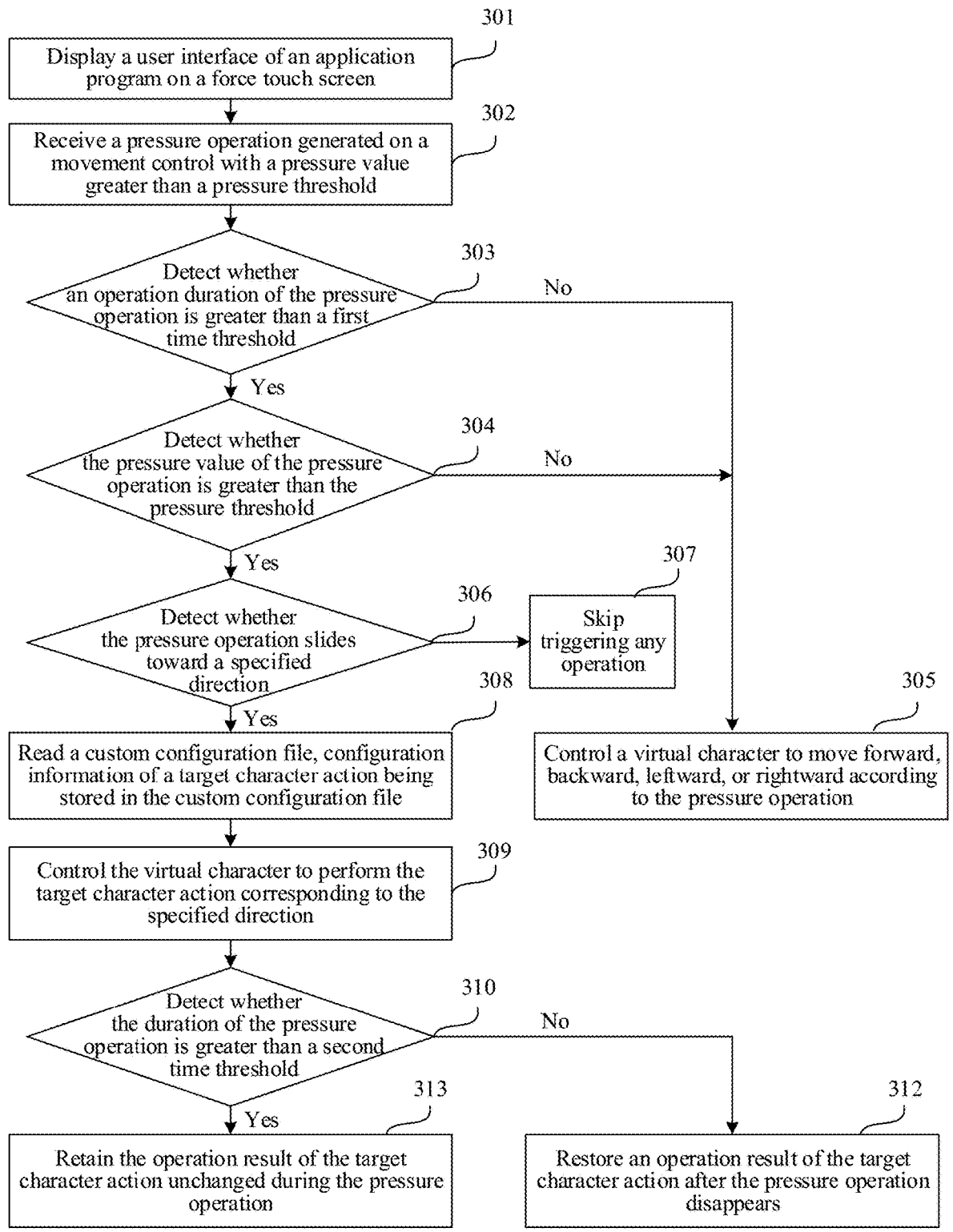
FIG. 8 is a flowchart of a virtual character control method according to another example embodiment of the disclosure.

FIG. 8 is a flowchart of a virtual character control method according to another example embodiment of the disclosure. The method is described by using an example in which the method is applied to the terminal shown in FIG. 1. Based on the example embodiment of FIG. 6, operation 311 is replaced by operation 313, to retain the operation result unchanged in a case that the duration of pressure operation is greater than the second time threshold. The method includes the following operation:

Operation 313: Retain (or maintain) the operation result of the target character action unchanged during the pressure operation.

When the duration of the pressure operation is greater than the second time threshold, the operation result after the target character action is performed is retained unchanged during the pressure operation. For example, when the target character action is the crouching action, the virtual character is controlled to retain the crouching posture unchanged during the pressure operation.

For example, the target character action corresponding to the downward direction is customized by the user to be the crouching action. The user performs a pressure operation in the downward direction on the movement control. The terminal detects that an operation duration of the pressure operation is greater than the first time threshold, and a pressure value of the pressure operation is greater than the pressure threshold. The terminal obtains a configuration file of the crouching action corresponding to the pressure operation in the downward direction according to the pressure operation. The terminal controls the virtual character to perform the crouching action according to configuration information of the crouching action in the configuration file. The terminal detects that the duration of the pressure operation is greater than the second time threshold, controls the virtual character to retain the crouching posture unchanged during the pressure operation, and restores the virtual character from the crouching posture to the standing posture after the pressure operation disappears.

According to the virtual character control method provided in the disclosure, a UI of an application program is displayed on a force touch screen, a pressure operation generated on a movement control is received, and in a case that the pressure operation meets a trigger condition, a virtual character is controlled to perform a target character action. In this way, two different control operations on the movement control are implemented by detecting a pressure value of the pressure operation generated on the movement control and using a pressure threshold as a boundary, which may save settings of some controls and reduce an area of a virtual environment image covered by controls.

According to the virtual character control method, it is detected that an operation duration of the pressure operation is greater than a second time threshold, and the target character action is repeatedly performed. In this way, the operation does not need to be repeated, which reduces the number of operations of a user, improves the efficiency of human-computer interaction, and improves the game experience of the user.

In addition, it is verified whether the operation duration of the pressure operation is greater than a first time threshold, which avoids a mis-operations in a game process.

Figure 9:
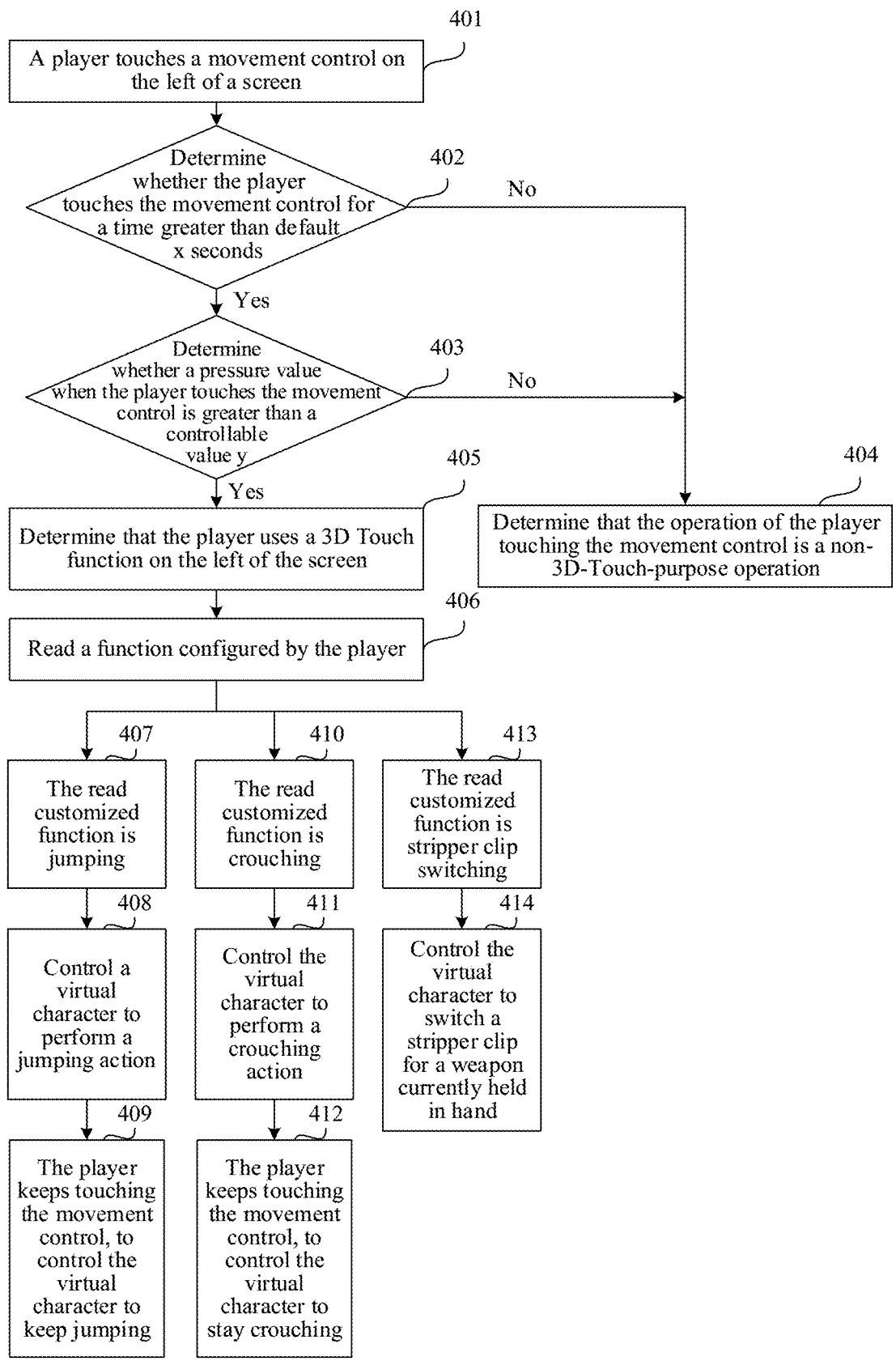
FIG. 9 is a flowchart of a virtual character control method according to another example embodiment of the disclosure.

FIG. 9 is a flowchart of a virtual character control method according to another example embodiment of the disclosure. The method is described by using an example in which the method is applied to the terminal shown in FIG. 1. The method includes the following operations 401-414:

Operation 401: A player touches a movement control on the left of a screen.

The terminal displays a UI of an application program, a virtual environment being displayed in the UI, and the virtual environment including a virtual character. Because virtual environment images are generally landscape pictures, to provide a clear game picture and a high utilization rate of the terminal screen, various games use a landscape game mode, and control buttons are set distributed on the left and right of the screen according to the landscape mode. The UI includes the movement control. The movement control is disposed on the left of the force touch screen, and the player performs a pressure operation on the movement control displayed on the left of the screen.

Operation 402: Determine whether the player touches the movement control for a time greater than default x seconds.

A duration of the pressure operation when a trigger condition is met is greater than x seconds by default in the application program. It is detected whether a touching duration that the player touches the movement control is greater than the default x seconds. If the touching duration is greater than the default x seconds, operation 403 is performed. Otherwise, operation 404 is performed.

Operation 403: Determine whether a pressure value when the player touches the movement control is greater than a controllable value y.

When the touching duration that the player touches the movement control is greater than x seconds, the terminal detects whether the pressure value when the player touches the movement control is greater than the controllable value y. The controllable value y is a pressure threshold. Optionally, the pressure threshold may be set by the programmer or customized by the player. When the pressure value is greater than the controllable value y, the pressure operation meets the trigger condition, and operation 405 is performed. Otherwise, the pressure operation does not meet the trigger condition, operation 404 is performed.

Operation 404: Determine that the operation of the player touching the movement control is a non-3D-Touch-purpose operation.

The non-3D-Touch-purpose operation includes controlling the virtual character to move forward, backward, leftward, or rightward through the movement control.

When the pressure operation does not meet the trigger condition of 3D Touch, the terminal performs the non-3D-Touch-purpose operation, for example, controls the virtual character to move forward, backward, leftward, or rightward.

Operation 405: Determine that the player uses a 3D Touch function of the movement control on the left of the screen.

When the pressure value of the pressure operation is greater than the controllable value y, the pressure operation meets the trigger condition of 3D Touch, and a corresponding function customized by the player is performed.

Operation 406: Read a function configured by the player.

The function customized by the player may be one of jumping, crouching, and stripper clip switching.

According to the function customized by the player, the terminal obtains corresponding configuration information of the function.

Operation 407: The read customized function is jumping.

When the function customized by the player is jumping, the terminal obtains configuration information corresponding to jumping.

Operation 408: Control the virtual character to perform a jumping action.

The terminal controls the virtual character to perform the jumping action according to the configuration information corresponding to jumping.

Operation 409: The player keeps touching the movement control, to control the virtual character to jump continuously.

In a case that the player continues to touch the movement control, and the pressure operation meets the trigger condition, the terminal controls the virtual character to keep jumping.

Operation 410: The read customized function is crouching.

When the function customized by the player is crouching, the terminal obtains configuration information corresponding to crouching.

Operation 411: Control the virtual character to perform a crouching action.

The terminal controls the virtual character to perform the crouching action according to the configuration information corresponding to crouching.

Operation 412: The player keeps touching the movement control, to control the virtual character to stay crouching.

When the player keeps touching the movement control, and the pressure operation meets the trigger condition, the virtual character retains a crouching posture unchanged.

Operation 413: The read customized function is stripper clip switching.

When the function customized by the player is stripper clip switching, the terminal obtains configuration information corresponding to stripper clip switching.

Operation 414: Control the virtual character to switch a stripper clip for a weapon currently held in hand.

The terminal controls the virtual character to perform a stripper clip switching action according to the configuration information corresponding to stripper clip switching.

According to the virtual character control method provided in the disclosure, two different control functions on a movement control are implemented by using a 3D Touch function to set an operation function and using a pressure threshold as a boundary, which can reduce settings of some controls, to reduce an area of a virtual environment image covered by controls.

In addition, it is detected whether an operation duration of a pressure operation is greater than a first time threshold, so that a mis-operation in a game process is avoided and the game experience of a user is improved.

FIG. 2, FIG. 4, FIG. 6, FIG. 8, and FIG. 9 are schematic flowcharts of the virtual character control method according to the embodiments. It is to be understood that operations in the flowcharts of FIG. 2, FIG. 4, FIG. 6, FIG. 8, and FIG. 9 are displayed in sequence based on indication of arrows, but the operations are not necessarily performed in a sequence indicated by the arrows. Unless explicitly specified in the disclosure, execution of the operations is not strictly limited in the sequence, and the operations may be performed in other sequences. In addition, at least some operations in FIG. 2, FIG. 4, FIG. 6, FIG. 8, and FIG. 9 may include a plurality of suboperations or a plurality of stages. The suboperations or the stages are not necessarily performed at the same time, but instead may be performed at different times. A performing sequence of the suboperations or the stages is not necessarily performing in sequence, but instead may be performing in turn or alternately with other operations or at least some of suboperations or stages of the other operations.

Figure 10:
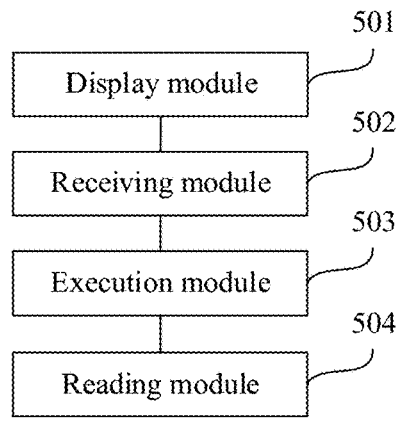
FIG. 10 is a block diagram of a virtual character control apparatus according to an example embodiment of the disclosure.

FIG. 10 is a block diagram of a virtual character control apparatus according to an example embodiment of the disclosure. The apparatus implements some or all of the functions of the above virtual character control method through software, hardware, or a combination thereof. The apparatus includes the following modules:

A display module 501 is configured to display a UI of an application program, the UI including a virtual environment image and a movement control superimposed on the virtual environment image, the virtual environment image being an image of a virtual environment, including a virtual character, observed with a perspective.

Optionally, a virtual environment image layer is an interface displayed based on the perspective, that is used for observing the virtual environment. The perspective may be at least one of a first-person perspective, a third-person perspective, or other perspectives. Other perspectives may be a top perspective or any other possible perspectives.

A receiving module 502 is configured to receive a pressure operation generated on the movement control with a pressure value greater than a pressure threshold.

An execution module 503 is configured to control, in a case that the pressure operation meets a trigger condition, the virtual character to perform a target character action, the target character action being an action different from a movement action (e.g., movement of a virtual character).

In some embodiments, the trigger condition includes that the pressure operation is a sliding operation toward a specified direction, the specified direction including, for example, at least one of an upward direction, a downward direction, a leftward direction, a rightward direction, an up leftward direction, an up rightward direction, a down leftward direction, and a down rightward direction.

In some embodiments, the execution module 503 is configured to control, in a case that the pressure operation meets the trigger condition, the virtual character to perform the target character action corresponding to the specified direction, target character actions corresponding to at least two specified directions being different.

In some embodiments, the target character action includes at least one of a jumping action, a crouching action, a stripper clip switching action, and a weapon switching action.

In some embodiments, the target character action is a jumping action in a case that the specified direction is the upward direction; and the target character action is a crouching action in a case that the specified direction is the downward direction.

In some embodiments, the apparatus further includes:
a reading module 504, configured to read a custom configuration file, configuration information of the target character action being stored in the custom configuration file.

In some embodiments, the trigger condition further includes that an operation duration of the pressure operation is greater than a first time threshold.

In some embodiments, the execution module 503 is further configured to perform the target character action repeatedly during the pressure operation in a case that a duration of the pressure operation is greater than a second time threshold.

In some embodiments, the execution module 503 is further configured to control the virtual character to repeatedly perform a jumping operation during the pressure operation.

In some embodiments, the execution module 503 is further configured to retain an operation result of the target character action unchanged during the pressure operation in a case that the duration of the pressure operation is greater than a second time threshold, and restore the operation result of the target character action after the pressure operation disappears.

In some embodiments, the execution module 503 is further configured to control the virtual character to retain a crouching posture unchanged during the pressure operation, and restore the virtual character from the crouching posture to a standing posture after the pressure operation disappears.

According to the virtual character control method provided in the disclosure, a UI of an application program is displayed on a force touch screen, a pressure operation generated on a movement control is received, and in a case that the pressure operation meets a trigger condition, a virtual character is controlled to perform a target character action. In this way, two different control operations on the movement control are implemented by detecting a pressure value of the pressure operation generated on the movement control and using a pressure threshold as a boundary, which may save settings of some controls and reduce an area of a virtual environment image covered by controls.

Figure 11:
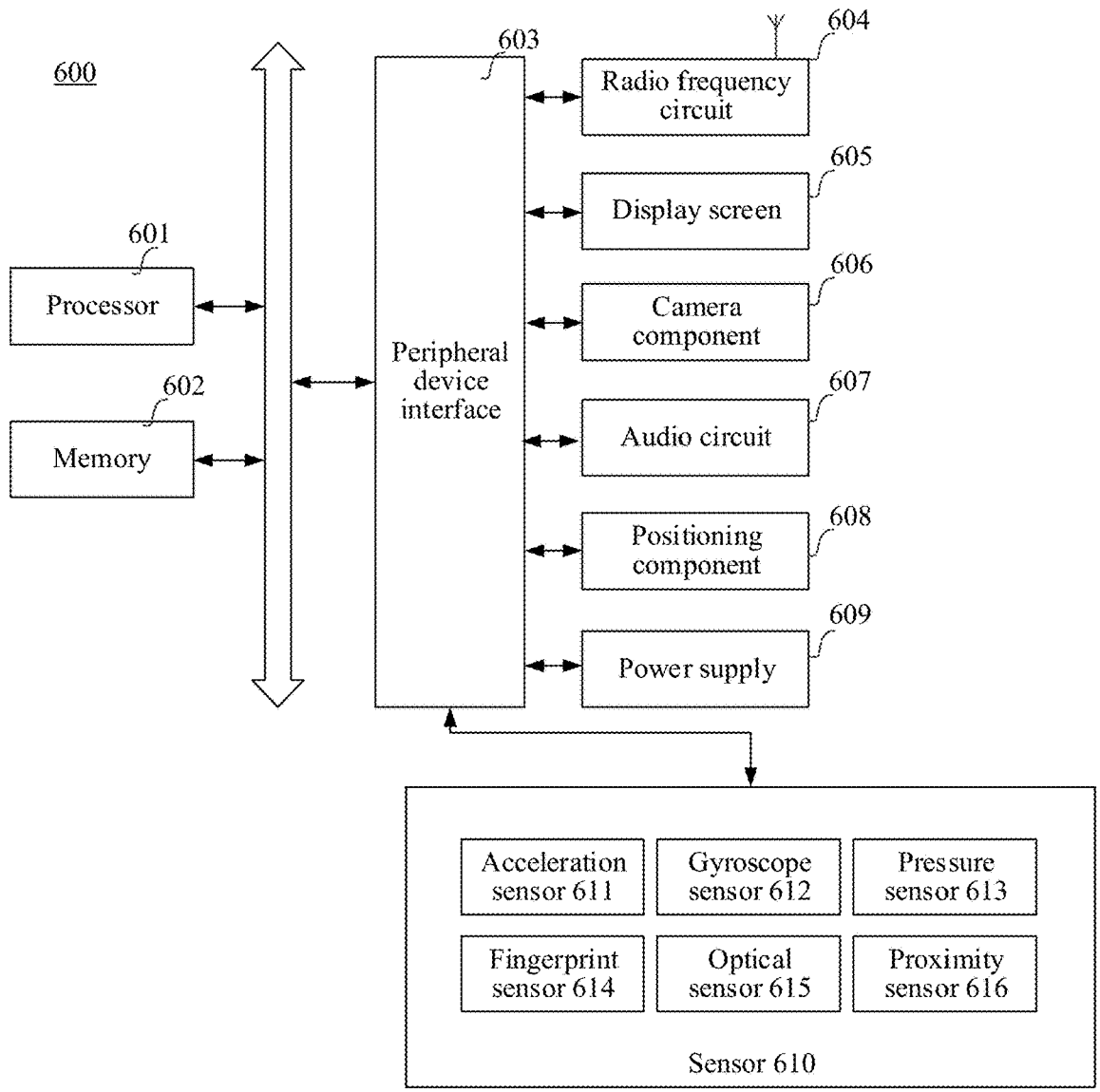
FIG. 11 is a structural block diagram of a terminal according to an example embodiment of the disclosure.

FIG. 11 is a structural block diagram of a terminal 600 according to an example embodiment of the disclosure. The terminal 600 may be a smartphone, a tablet computer, a Moving Picture Experts Group Audio Layer III (MP3) player, an MP4 player, a notebook computer, or a desktop computer. The terminal 600 may also be referred to as a user device, a portable terminal, a laptop terminal, a desktop terminal, or other names.

Usually, the terminal 600 includes a processor 601 and a memory 602.

The processor 601 may include one or more processing cores, for example, a 4-core processor or an 8-core processor. The processor 601 may be implemented by using at least one hardware form of a digital signal processor (DSP), a field-programmable gate array (FPGA), and a programmable logic array (PLA). The processor 601 may further include a main processor and a co-processor. The main processor is a processor configured to process data in an active state, which is also referred to as a central processing unit (CPU). The co-processor is a low-power processor configured to process data in a standby state. In some embodiments, the processor 601 may be integrated with a graphics processing unit (GPU), the GPU being configured to render and draw content to be displayed on a display screen. In some embodiments, the processor 601 may further include an artificial intelligence (AI) processor, the AI processor being configured to process a computing operation related to machine learning.

The memory 602 may include one or more computer-readable storage media. The computer-readable storage medium may be non-transitory. The memory 602 may further include a high-speed random access memory (RAM) and a non-volatile memory such as one or more magnetic disk storage devices or flash memory devices. In some embodiments, the non-transitory computer-readable storage medium in the memory 602 is configured to store at least one instruction. The at least one instruction is executed by the processor 601 to implement the virtual character control method according to the method embodiment of the disclosure.

In some embodiments, the terminal 600 may optionally further include a peripheral device interface 603 and at least one peripheral device. The processor 601, the memory 602 and the peripheral device interface 603 may be connected by a bus or a signal cable. Each peripheral device may be connected to the peripheral device interface 603 through the bus, the signal cable, or a circuit board. Specifically, the peripheral device includes at least one of a radio frequency (RF) circuit 604, a display screen 605, a camera component 606, an audio circuit 607, a positioning component 608, and a power supply 609. The peripheral device 603 may be configured to connect at least one of the peripheral device related to input/output (I/O) to the processor 601 and the memory 602. The RF circuit 604 is configured to receive and transmit RF signals, also referred to as electromagnetic signals. The display screen 605 is configured to display a UI. The UI may include a graphic, a text, an icon, a video, and any combination thereof. When the display screen 605 is a touch display screen, the display screen 605 is further capable of collecting touch signals on a surface of the display screen 605 or above the surface. The camera 606 is configured to collect images or videos. The audio circuit 607 may include a microphone and a speaker. The microphone is configured to collect sound waves from a user and an environment, convert the sound waves into electrical signals, and input the electrical signals into the processor 601 for processing, or input the electrical signals into the RF circuit 604 to implement voice communication. The positioning component 608 is configured to determine a current geographic location of the terminal 600 to implement navigation or a location based service (LBS). The power supply 609 is configured to supply power to the components in the terminal 600. The power supply 609 may be an alternating current, a direct current, a disposable battery, or a rechargeable battery.

In some embodiments, the terminal 600 further includes one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616. The acceleration sensor 611 may detect the acceleration magnitude on three coordinate axes of a coordinate system established by the terminal 600. The gyroscope sensor 612 may detect a body direction and a rotation angle of the terminal 600, and the gyroscope sensor 612 may cooperate with the acceleration sensor 611 to collect 3D actions of the user on the terminal 600. The pressure sensor 613 may be disposed on a lateral border of the terminal 600 and/or below the display screen 605. When the pressure sensor 613 is disposed on the lateral border of the terminal 600, the pressure sensor 613 may detect a signal of holding the terminal 600 by the user, and the processor 601 may recognize left and right hands or perform a shortcut operation according to the holding signal collected by the pressure sensor 613. When the pressure sensor 613 is disposed below the display screen 605, the processor 601 controls an operable control in the UI according to a pressure operation of the user on the display screen 605. The fingerprint sensor 614 is configured to collect a fingerprint of the user, and the processor 601 identifies the identity of the user according to the fingerprint collected by the fingerprint sensor 614, or the fingerprint sensor 614 identifies the identity of the user according to the collected fingerprint. The optical sensor 615 is configured to collect an intensity of ambient light. The proximity sensor 616, also referred to as a distance sensor, is usually disposed on a front panel of the terminal 600. The proximity sensor 616 is configured to collect a distance between the user and a front surface of the terminal 600.

A person skilled in the art would understand that a structure shown in FIG. 11 constitutes no limitation on the terminal 600, and the terminal 600 may include more or fewer components than those shown in the figure, or some components may be combined, or a different component deployment may be used.

A person of ordinary skill in the art would understand that all or some of the operations of the methods in the embodiments may be implemented by a program instructing relevant hardware. The program may be stored in a computer-readable storage medium. The computer-readable storage medium may be a computer-readable storage medium included in the memory in the foregoing embodiments, or may be a computer-readable storage medium that exists alone and is not fitted into a terminal. The computer-readable storage medium stores at least one instruction, at least one program, a code set, or an instruction set, the at least one instruction, the at least one program, the code set or the instruction set being loaded and executed by the processor to implement the virtual character control method according to any one of FIG. 1 to FIG. 8.

Optionally, the computer-readable storage medium may include: a read-only memory (ROM), a RAM, a solid state drive (SSD), an optical disc, or the like. The RAM may include a resistance RAM (ReRAM) and a dynamic RAM (DRAM). The sequence numbers of the foregoing embodiments of the disclosure are merely for description purpose and do not indicate the preference of the embodiments.

A person of ordinary skill in the art would understand that all or some of the operations of the foregoing embodiments may be implemented by hardware or by a computer program instructing relevant hardware. The program may be stored in a computer-readable storage medium. When the program is executed, the program may include the procedures of the embodiments of the foregoing methods. Any reference to a memory, storage, database or another medium used in the embodiments provided in the disclosure may include a non-volatile and/or volatile memory. The non-volatile memory may include a ROM, a programmable ROM (PROM), an electrically programmable ROM (EPROM), an electrically erasable programmable ROM (EEPROM), or a flash memory. The volatile memory may include a RAM or an external cache. By way of illustration and not limitation, the RAM is available in a variety of forms, such as a static RAM (SRAM), a dynamic RAM (DRAM), a synchronous DRAM (SDRAM), a double data rate SDRAM (DDRS-DRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. A virtual character control method, performed in a terminal, an application program being installed in the terminal, the method comprising:
   displaying a user interface (UI) of the application program, the UI comprising a virtual environment image and a movement control superimposed and being placed within the virtual environment image, and the virtual environment image being an image of a virtual environment, including a virtual character, observed with a perspective, the movement control being a single icon for receiving a user pressure operation;
   receiving a first pressure operation with respect to the movement control, the first pressure operation being a sliding operation having a pressure less than a pressure threshold;
   based on the first pressure operation, controlling the virtual character to move in a certain direction or change a direction of the perspective of observing the virtual environment according to a direction in which the sliding operation is performed;

receiving a second pressure operation with respect to the same movement control, the second pressure operation being a sliding operation having a pressure greater than the pressure threshold; and controlling, based on the second pressure operation satisfying a trigger condition, the virtual character to perform a target action in the virtual environment, the target action being an action of a different type from an action performed based on the first pressure operation, wherein the trigger condition comprises a first condition that a duration of the second pressure operation is greater than a first time threshold.

2. The method according to claim 1, wherein the trigger condition further comprises a second condition that the sliding operation of the second pressure operation is toward a specified direction.

3. The method according to claim 2, wherein the controlling based on the second pressure operation satisfying the trigger condition comprises:
controlling, based on the second pressure operation satisfying the first and the second condition, the virtual character to perform the target action corresponding to the specified direction of the sliding operation of the second pressure operation, among target actions corresponding to at least two specified directions.

4. The method according to claim 1, wherein the target action comprises at least one of a jumping action, a crouching action, a stripper clip switching action, and a weapon switching action.

5. The method according to claim 3, wherein the controlling the virtual character to perform the target action corresponding to the specified direction of the sliding operation of the second pressure operation comprises:
controlling the virtual character to perform a jumping action based on the second pressure operation being the sliding operation toward an upward direction; and
controlling the virtual character to perform a crouching action based on the second pressure operation being the sliding operation toward a downward direction.

6. The method according to claim 1, further comprising:
obtaining a configuration file, configuration information of the target action being stored in the configuration file, wherein the target action is performed according to the configuration information.

7. The method according to claim 1, wherein the controlling based on the second pressure operation satisfying the trigger condition comprises:
controlling, based on the second pressure operation satisfying the trigger condition, the virtual character to repeatedly perform the target action during the second pressure operation.

8. The method according to claim 7, wherein the repeatedly performing the target action comprises:
controlling the virtual character to repeatedly perform a jumping action during the second pressure operation.

9. The method according to claim 1, wherein the controlling based on the second pressure operation satisfying the trigger condition comprises:
controlling, based on the second pressure operation satisfying the trigger condition, maintaining a result of the target action during the second pressure operation, and restoring the virtual character from the result of the target action when the second pressure operation ends.

10. The method according to claim 9, wherein the maintaining comprises:
controlling the virtual character to maintain a crouching posture during the second pressure operation, and restoring the virtual character from the crouching posture to a standing posture when the second pressure operation ends.

11. A virtual character control apparatus, an application program being installed in a terminal, the apparatus comprising:
at least one memory configured to store program code; and
at least one processor configured to read the program code and operate as instructed by the program code, the program code comprising:
display code configured to cause at least one of the at least one processor to display a user interface (UI) of the application program, the UI comprising a virtual environment image and a movement control superimposed and being placed within the virtual environment image, and the virtual environment image being an image of a virtual environment, including a virtual character, observed with a perspective, the movement control being a single icon for receiving a user pressure operation;
first receiving code configured to cause at least one of the at least one processor to receive a first pressure operation with respect to the movement control, the first pressure operation being a sliding operation having a pressure less than a pressure threshold;
first control code configured to cause at least one of the at least one processor to, based on the first pressure operation, control the virtual character to move in a certain direction or change a direction of the perspective of observing the virtual environment according to a direction in which the sliding operation is performed;
second receiving code configured to cause at least one of the at least one processor to receive a second pressure operation with respect to the same movement control, the second pressure operation being a sliding operation having a pressure greater than the pressure threshold; and
second control code configured to cause at least one of the at least one processor to, based on the second pressure operation satisfying a trigger condition, control the virtual character to perform a target action in the virtual environment, the target action being an action of a different type from an action performed based on the first pressure operation,
wherein the trigger condition comprises a first condition that a duration of the second pressure operation is greater than a first time threshold.

12. The apparatus according to claim 11, wherein the trigger condition further comprises a second condition that the sliding operation of the second pressure operation is toward a specified direction.

13. The apparatus according to claim 12, wherein the second control code further causes at least one of the at least one processor to, based on the second pressure operation satisfying the first and the second condition, control the virtual character to perform the target action corresponding to the specified direction of the sliding operation of the second pressure operation, among target actions corresponding to at least two specified directions.

14. The apparatus according to claim 13, wherein the second control code further causes at least one of the at least one processor to:
control, based on the second pressure operation satisfying the trigger condition, the virtual character to perform a jumping action based on the second pressure operation being the sliding operation toward an upward direction; and control, based on the second pressure operation satisfying the trigger condition, the virtual character to perform a crouching action based on the second pressure operation being the sliding operation toward a downward direction.

15. The apparatus according to claim 11, wherein the program code further comprises:

obtaining code configured to cause at least one of the at least one processor to obtain a configuration file, configuration information of the target action being stored in the configuration file, wherein the target action is performed by referring to the configuration information.

16. The apparatus according to claim 11, wherein the second control code further causes at least one of the at least one processor to, based on the second pressure operation satisfying the trigger condition, control the virtual character to repeatedly perform the target action during the second pressure operation.

17. The method according to claim 1, wherein the terminal comprises a processor and a memory storing program code, and the method of claim 1 is performed based on the program code being executed by the processor.

18. A non-transitory computer-readable storage medium, storing program code executable by a processor to perform:

displaying a user interface (UI) of an application program, the UI comprising a virtual environment image and a movement control superimposed and being placed within the virtual environment image, and the virtual environment image being an image of a virtual environment, including a virtual character, observed with a perspective, the movement control being a single icon for receiving a user pressure operation;

receiving a first pressure operation with respect to the movement control, the first pressure operation being a sliding operation having a pressure less than a pressure threshold;

based on the first pressure operation, controlling the virtual character to move in a certain direction or change a direction of the perspective of observing the virtual environment according to a direction in which the sliding operation is performed;

receiving a second pressure operation with respect to the same movement control, the second pressure operation being a sliding operation having a pressure greater than the pressure threshold; and controlling, based on the second pressure operation satisfying a trigger condition, the virtual character to perform a target action in the virtual environment, the target action being an action of a different type from an action performed based on the first pressure operation, wherein the trigger condition comprises a condition that a duration of the second pressure operation is greater than a first time threshold.

* * * * *